United States Patent [19]

Halene

[11] Patent Number: 4,667,815
[45] Date of Patent: May 26, 1987

[54] HYDROGEN STORAGE

[75] Inventor: Clemens Halene, Duesseldorf, Fed. Rep. of Germany

[73] Assignee: Mannesmann Aktiengesellschaft, Duesseldorf, Fed. Rep. of Germany

[21] Appl. No.: 820,672

[22] Filed: Jan. 21, 1986

[30] Foreign Application Priority Data

Jan. 21, 1985 [DE] Fed. Rep. of Germany ....... 3532311

[51] Int. Cl.⁴ .............................................. F17C 1/00
[52] U.S. Cl. ...................................... 206/0.7; 53/400; 206/0.6; 220/3
[58] Field of Search ................. 34/15; 62/48; 206/0.6, 206/0.7; 220/3, 88 R; 422/200, 201; 423/248, 648 R; 48/175, 179; 53/400

[56] References Cited

U.S. PATENT DOCUMENTS

| | | | |
|---|---|---|---|
| 2,388,134 | 10/1945 | Flosdorf et al. | 34/15 |
| 3,235,344 | 2/1966 | Dreyer et al. | 220/3 |
| 4,133,426 | 1/1979 | Turillion et al. | 220/3 |
| 4,446,111 | 5/1984 | Halene et al. | 206/0.7 |
| 4,598,836 | 7/1986 | Wessel | 206/0.7 |

Primary Examiner—William Price
Assistant Examiner—Jimmy G. Foster
Attorney, Agent, or Firm—Ralf H. Siegemund

[57] ABSTRACT

A metal hydride storage facility having a cylindrical pressure vessel and a centrally mounted gas conducting tube. Self contained boxes, being annular in shape, are stacked within the vessel. The boxes contain the metal hydride. Each body is capable of expansion.

15 Claims, 6 Drawing Figures

HYDROGEN STORAGE

BACKGROUND OF THE INVENTION

The present invention relates to a metal hydride storage facility constructed as a cylindrical pressure vessel having centrally arranged a gas (hydrogen) conduit, wherein the granulated metal capable of forming hydride is partitioned in axial direction by means of disc shaped bulk head sheets each being provided with a central opening traversed by the gas conduit.

Generally metal hydrides serve for the storage of hydrogen. A pressure vessel is usually provided and made of a metal which does not form any hydride. The particular metal hydride stored therein can be used in a variety of ways. Storage facilities of this type are based on a physical phenomenon which is comprised of a relationship between hydrogen concentration in molten metal and hydrogen pressure and temperature in the storage vessel. The development of suitable pressure vessels is, however, a significant problem. This is so because the storage facility, as stated, is comprised originally of the vessel into which a material of powdery or granular consistency has been filled. This material has the tendency of expanding physically to a considerable extent. Surprisingly the volume increase is significantly larger than expected on the basis of crystal lattice expansion based on the hydride forming process. The additional volume increase is to be contributed to the progressing subdivision and breaking up of the rather brittle grains of the storage material. Moreover it was found that in the case of high speeds the flowing hydrogen may actually redistribute the material inside of the pressure vessel. This redistribution of storage material may in fact lead locally to filling densities exceeding the maximum permissible filling density so that upon subsequently loading the material (hydrogen storage) the pressure vessel may actually experience locally pressure peaks of such high values that may lead to its destruction. Tensioning and expansion of the pressure vessel which may therefore have to be expexted as a result of excessive forces in the powder bed pose in fact a very serious problem of safety as far as operation of the device is concerned. A prevention of any progressive deforming of the vessel could lead to overdimensioning of the pressure vessel wall but that in turn leads to unacceptable overall gross weight of this storage facility. Therefore the next obvious approach appears to be limiting of the effective filling density of the material.

The reaction process of hydride storage facilities under consideration of high power and throughput during loading and unloading (hydrogen release) leaves often much to be desired. This has been contributed to the poor thermal conductivity of the powdery metal which limits technologically to a considerable extent the binding and release of enthalpy. The effect of the powder structure is a serious problem here as can be seen from the fact that technically realizable filling density of the powdery metal is actually at about 50% of the theoretical filling density.

U.S. Pat. No. 4,446,111 (see also German printed patent application No. 31 25 276) proposes to improve the heat exchange inside such a storage facility for hydrogen by means of laminalike partitioning sheets which serve as heat conductors and partition actually the hydride forming metal in axial direction in so to speak a series of discs. During the construction of the metal hydride storage facility the granular metal is preferably introduced in form of pellets of a cylindrical configuration. These pellets have a central perforation in order to accomodate the centrally disposed gas conduit running in the interior of the vessel. The purpose of providing pellets is also to be seen in that the amount of powder that is placed into the storage facility can be very accurately metered. Also, pellets are easy to handle and their use reduces fire danger. However, the production of pellets poses by and in itself another problem and is connected with a number of drawbacks. In order to make sure that pellets have the sufficient strength one has to realize that the raw material is a very brittle powderized metal. In order to ensure such strengths it is customary to ass some aluminum powder to the hydride forming powder prior to press forming it into pellets. The amount of aluminum powder so added is in the order of about 5% of the relevant volume. This Al powder acts as a binder. The addition of Al powder does indeed increase the heat conductivity of the hydride storage facility generally but only to a limited extent. The adding of Al has the drawback that for the same volume of the pressure vessel the amount of volume of hydride forming metal is correspondingly reduced, meaning that the storage capacity is somewhat reduced. Also the press working of pellets requires a fine grinding of the respective components with the grain spectrum running from 50 micrometers to about 250 micrometer. It has to be noted further that the hydride metal is very pyrophoric. This aspect requires that to a considerable extent safety features have to be provided for during the manufacture. For example, a protective gas atmosphere is mandatory which in turn makes the working even more difficult. Thus, the pellet vs. no-pellet technology constitutes a significant improvement but there is room for further improvement from an overall point of view.

It can be seen that from a technological point of view the last mentioned solution is indeed of value if the permissible filling densities are observed under adequate loading and unloading characteristic of a suitable metal hydride storage facility. Thus, an adequate use life can be expected. On the other hand the drawback is that the required production steps such as grinding, mixing and press working of the storage material into pellets is a very expensive procedure. This actually reduces the economic value and the cost of the metal hydride storage facility significantly so that the economic value of this procedure is drastically reduced. Moreover it has to be considered that the adding of aluminum powder actually prevents reuse of the molten metal for purposes of hydrogen storage because the aluminum powder simply cannot be separated anymore mechanically or through smelting from the hydride forming material; at least not in any economically feasible manner.

DESCRIPTION OF THE INVENTION

It is an object of the present invention to provide a new and improved metal hydride storage facility such that for a given pressure vessel dimension the hydrogen storage capacity is made as large as possible and that the manufacturing cost can be reduced as compared with prior art practice under consideration of operative strength, use life, safety against accident and assurance of high quality without limitations or compromise.

It is a particular object of this invention to provide a new and improved metal hydride storage facility meeting the aforementioned requirements and a method is to be provided for the making and activating of such a metal hydride storage facility.

It is a specific object of the invention to provide a new and improved hydrogen/hydride storage facility in which, as features, the concepts of a pressure vessel with central gas tube and partitioning of the interior are maintained.

In accordance with the preferred embodiment of the present invention, partitioning sheets for the metal hydride storage facility are constructed to form initially self contained upper and lower parts of annular boxes and the volume of all the completely filled boxes as far as any hydride forming metal content therein is concerned, is smaller by at least an amount given by the specific volume increase of the metal content when subjected to the hydride forming reaction after several hydrogen storage and release cycles and as compared with the original state prior to the first forming step. Specifically the lower part of each box is to have an inner jacket or flange being juxtaposed to the central induct or gas tube and an outer jacket or flange abutting or nearby abutting the cylindrical inner wall of the pressure vessel; the inner and outer flanges having axial ends and establishing a common plane. The respective upper box part grips around the inner flange of the box lower part and by means of an outer jacket or flange. The outer jacket of the lower part should be crimped for cooperation with the upper part of the box. All of the outer jackets or flanges of upper as well as lower box parts actually should abut the inner wall of the pressure vessel. The inner jacket or flange of the lower box part is partially configured as a cone and partially as a cylinder whereby a surface line of the cone and a surface line of the cylinder, in sum total, are larger than the largest radius of the cone minus the outer radius of the inner gas tube. The inner jacket or flange of the upper box part should have a height (axial length) such that upon being folded up (radially) it abuts the central gas conduit i.e. whenever stretched into the plane of the cover surface of the upper part of that box. Form matching connection should be provided between upper and lower box parts constructed in the form of a beadlike connection. The bottom of the lower box part should have an annular protrusion which runs around the gas tube in the center. This protrusion should extend into the box's interior. A similar protrusion should be provided in the upper part of the box. It is also suggested to partition each box at least once and this partition should be constructed as an inserted annular intermediate surface.

It should be realized that the metal hydride storage facility as per the above mentioned U.S. Pat. No. 4,446,111 constitutes a point of departure for the invention. The basic concept offered here is that accurate metering of the powderized metal to be inserted and included in the storage facility should not be provided in forms of pressed pellets but the granulated metal should be filled in an annular boxes which in a very simple manner can be inserted and stacked in the pressure vessel. These boxes are filled completely with the granulate of the hydride forming metal prior to this insertion and this step is carried out in such a manner that each box will receive exactly the same granulated material. The boxes are then closed so that subsequently they can be handled in a simple manner and quite safely. These boxes are constructed each from an upper and lower part and are basically constructed as flat cylindrical boxes with a central opening so that they are of annular configuration. The central opening will be traversed by the gas tube or conduit of the pressure vessel which is common to all of the various storage elements inside the pressure vessel. It is suggested to construct the boxes such that upon completely filling the pressure vessel with such boxes the sum total of the volume of all of them is smaller than the net interior volume of the pressure vessel itself which is given by the internal volume of the pressure vessel proper minus the volume of the centrally placed gas tube. The volume difference should be sufficient to equal the specific volume increase of the particular metal when having undergone the hydride forming reaction, even after several such loading and unloading cycles and as compared with the original unloaded state. This feature guarantees that the metal in the loaded state i.e. upon and after storage of hydrogen will be permitted to expand adequately. This expansion will lead to a deformation of the respective boxes but will not act on the pressure vessel itself. Thus during the first loading cycle, when hydrogen is introduced into the vessel for the first time each of these boxes containing hydride forming metal will undergoa lasting deformation. The configuration of these individual boxes is such that even when deformed the annularly contoured metal therein and particularly upper and lower part of each of the boxes remain therein as partitions and thereby they prevent uncontrolled material redistribution inside the pressure vessel during operation.

In accordance with another aspect of the invention the upper and lower parts of the respective boxes serve as heat conductors particularly during the loading (hydrogen storage) and unloading (hydrogen release) operation. A particular advantage of the operation here is to be seen in that the hydride forming metal powder does not have to be excessively fine as is necessary in accordance with the state of the art. In fact a grain size from 0.2 to 2 mm suffices. One has to take care however that the grain size consistency and distribution remains constant and uniform throughout, on a statistical basis. The spectrum of grain size distribution should remain uniform so that for the same filling volume of the boxes one actually will in fact introduce exactly the same amount of material into each and every one of the boxes and therefore in all of them as far as filling the pressure vessel as a whole is concerned.

It can be seen that the invention avoids press working for the making of any pellets, and the adding of aluminum powder is no longer necessary. This feature increases the storage capacity per unit volume of pressure vessel interior and the reuse of the hydride forming metal is ensured. The box utilization renders superfluous certain steps of the previous practice, but the filled boxes can be transported i.e. they can be used as transport containers for the hydride forming metal. This means that the transport from production to use location is very simple.

In order to permit a simple metering process of the granulated material the granulate should be filled into the lower part of each box and then the upper part is placed thereon. The bottom of the upper box part will now abut the inner and outer flanges as they end in a common plane. This feature permits simple and uniform filling of the box: the box is filled with an excess of granulate and the excess can then be simply stripped off. Moreover the upper part with its outer and its inner jacket or flange grips around the lower box part. In principle the relationship could be reversed. Another feature is to be seen in beading the outer flange of the upper box part around the lower box part. This way one obtains a smooth cylindrical surface vis-a-vis the central gas tube. A large surface area is also established for abutment of the axially aligned, outer surfaces of the outer flanges of the upper and lower box part, against the cylindrical inner surface of the pressure vessel. This feature permits good heat conduction from the outside of the vessel into its interior, particularly the metal in the boxes.

It is of advantage to provide the expansion volume for the hydride forming metal in the vicinity of the gas tube in the interior of the vessel i.e. to use the central opening of the individual boxes for purposes of volume expansion. In accordance with a further advantageous feature of the invention it is suggested to provide this central opening in a cylindrical configuration which is coaxial as far as the vessel is concerned, and merely a part of the lower part of the box is configured as a truncated cone. Further in accordance with the invention upper and lower box parts are configured so that the deformation on account of the expansion of the hydride forming metal during the loading process with hydrogen will encounter the following situation. On one hand the contact of the radius outside of the boxes with the inner wall of the pressure vessel is just maintained while on the other hand positive deformation of the box at the inner opening causes a tight abutment of upper and lower box parts as against the gas conduit in the interior of the pressure vessel. The two box parts are therefore constructed basically with sufficiently large surface areas so that the respective abutments are guaranteed. In view of a configuration in which the area of the central opening of the box is configured partially with a cylindrical and partially with a frustoconical contour it can be ensured that the geometric surface lines of the cone as well as of this cylinder together are larger than the radius of the largest circle of the cone minus the outer radius of the gas tube. Also the inner jacket or flange of the upper box part in the central area should have such a height that is larger than the distance of the upper box part from the gas tube, so that as this inner flange is, so to speak, folded up under pressure it will indeed abut with the gas tube on loading, particularly it will be stretched into the plane of the cover surface of the upper part of the box.

In order to avoid any problems in handling a filled box, upper and lower parts should be secured against unintentional opening. This may obtain through a contour matching connection e.g. through the beading of the edge of the inner flange of the upper part of the box as already mentioned. Positive forcelocking connections of any other contour matching connections between the box parts are within the scope of this invention.

Bulges or protrusions are also provided in the bottom of the lower part of the box or in the cover surface of the upper part of the box or both; there may be one or several such annular protrusions and they all loop around the central gas tube i.e. the central opening of each of the respective boxes. This feature contributes to the compensation of volume increase of the hydride forming metal during loading and taking up of hydrogen. In some cases it may be of advantage to partition the volume of the chamber interior of each of the boxes. For this one may provide one or several annular discs constructed basically similar to the lower part of the respective box, and these annuli serve as intermediate partitions. From an overall point of view the hydride forming material is now partitioned further in axial direction as far as the storage facility as a whole is concerned. Analogously partitioning in radial direction is feasible, e.g. through the inclusion of sector shaping partition walls. Since these partitionings of one kind or another are to be made of material having a high thermal conductivity most metals are suitable here provided they do not form any hydride. These partitions improved further the heat conduction within each of the boxes.

The method for making and activating a metal hydride storage facility in accordance with the invention is to be seen in the following features. At first a hydrid forming metal is established at a granulate size from between 0.2 to 2 mm grain size. Boxes of the type described are filled completely with granulate, and in each instance they are closed by the upper part of the respective box. The essentially cylindrically configured pressure vessel is at this point still open on one axial front end and is now filled with boxes of the type described in that they are stacked into the vessel with the central gas tube serving as a kind of guidepost. Thereafter the still open front end of the pressure vessel is closed. The metal hydride material is next activated in a known fashion. Basically this activation is carried out by evacuating the entire interior of the pressure vessel and heating thereafter the entire facility. After the proper temperature has been reached hydrogen is introduced i.e.- teh storage facility is now loaded with hydrogen to obtain the hydrid forming reaction. This hydrogen loading step causes a considerable increase in volume of the hydride forming material which as far as each individual box is concerned causes them to be deformed. The deformation however is of no damaging consequence since the total volume of these boxes prior to this expansion process is sufficiently smaller than the net volume of the interior of the pressrue vessel. The upper and lower part of each box abut (or remain in abutment with) the inner surface of the pressure vessel. Further deformation of the boxes causes them to abut against the centrally arranged gas tube. This way it is avoided that hydride forming metal will be moved (axially) in the interior of the vessel in an uncontrollable fashion; the boxes still serve as axial partitions.

The activation of the new metal hydride storage facility is considerably cheaper and simpler as compared with prior art practice because a number of expensive prior art steps can be avoided. This includes very fine grinding of the granulate mixture and grinding of another metal such as aluminum and production i.e. press working of the powder into pellets. Moreover, the reaction process is carried out uniformly and very satisfactorily on account of fast loading and release simply because each box as far as its upper and lower part is concerned and possibly under participation of any intermediate partition provide excellent heat conduction into and out of the boxes vis-a-vis the surface of the pressure vessel.

The inventive method may be carried out in the alternative by treating each box differently, namely by evacuating it and heating the same prior to insertion in the vessel. In order to immunize the boxes against atmospheric effects one should then provide some protective gas in the interior of each box. Using this approach obviates the need for heating and evacuating the entire assembled hydride storage facility. After filling the pressure vessel with the boxes and closing the vessel one merely needs introduction of hydrogen for purposes of activating the unit and causing the expansion of the boxes.

DESCRIPTION OF THE DRAWINGS

While the specification concludes with claims particularly pointing out and distinctly claiming the subject matter which is regarded as the invention, it is believed that the invention, the objects and features of teh invention and further objects, features and advantages thereof wil be better understood from the folowing description taken in conjunction with the accompanying drawings in which:

FIG. 1a is a diagram showing certain details of relevant geometric and dimensional features;

Figure 1:
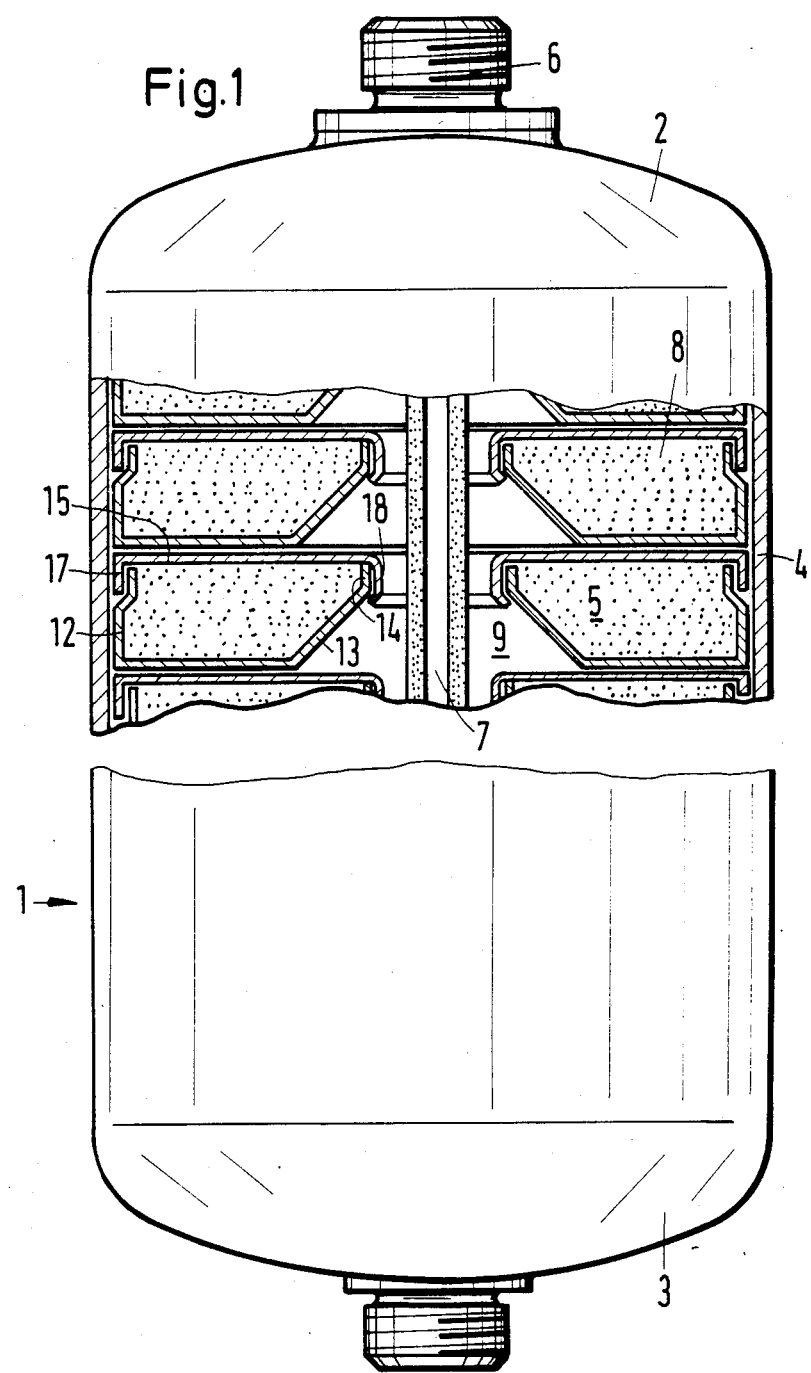
FIG. 1 is a elevation and partial cross sectional view of a pressure vessel with introduced boxes as per the preferred embodiment of the present invention showing the prehydride forming operational state.

Proceeding now to the detailed description of the drawing reference is made to FIG. 1 showing a metal hydride storage facility 1 in which the hydride has not yet been formed, but the facility has been assembled. This storage facility 1 is generally comprised fo a cylindrical, tubular central part 4 of a pressure vessel having also end caps 2 and 3 for closing the vessel. Together these parts 2, 3, and 4 establish the pressure vessel. The two caps 2 and 3 are provided with centrally arranged gas nipples 6. A gas conductive tube or conduit 7 is arranged centrally inside the pressure vessel 1. It extends in axial direction and is considered to be a filter or sieving tube, having appropriate perforations. Powdery material should be kept out of that tube, but gas must flow freely into and out of the tube's wall.

Numerous self contained boxes 5 of the type which constitute the substance of this invention are arranged inside the pressure vessel 1. Each of these boxes is of annular configuration and is therefore traversed by the tube 7, the latter serving, so to speak, as a central guidepost around which the boxes 5 are stacked inside vessel 1. The interior of each box 5 is filled with granulated metal 8 capable of forming hydride in a manner known per se. Each of the boxes is comprised of an upper part 10 and of a lower part 15. The lower part 10 is provided with an outer jacket or flange 12 which is provided with a crimping or recess 12a. The inner jacket or flange of the lower part 10 of each box is comprised of a cylindrical portion 14 merging with a truncated conelike jacket portion 13.

FIG. 1a illustrates relevant geometric aspects involved. 13a refers to a geometric surface line of truncated cone 13 and 14a is a surface line of the adjoining cylinder 14. The length of this line 13a plus the length of line 14a is smaller than the distance 13b measured from the outer surface of tube 7 to the outer edge 13c of the cone 13. This is just another way of saying that the radius of the largest cone circle (i.e. of 13c) minus outer radius of tube 7 is smaller than 13a plus 14a.

The inner flange 13-14 (particularly 14) as well as the outer flange 12 of the lower part of each box 10 all end in a common plane, what a plane of abutment with the bottom of upper part 15. The upper part 15 of the box reaches around the lower part 10 of the respective box by means of flange 17, adjoining crimp or recess 12a. Moreover each upper box part 15 is provided with a cylindrical inner jacket 18 which reaches around the upper portion of the outer jacket 12 i.e. the inner flange 13 and 14 thereof. The height of this flange 18, i.e. its axial dimension is such that it is larger than the distance of the flange 18 from the tube 7.

Figure 2:
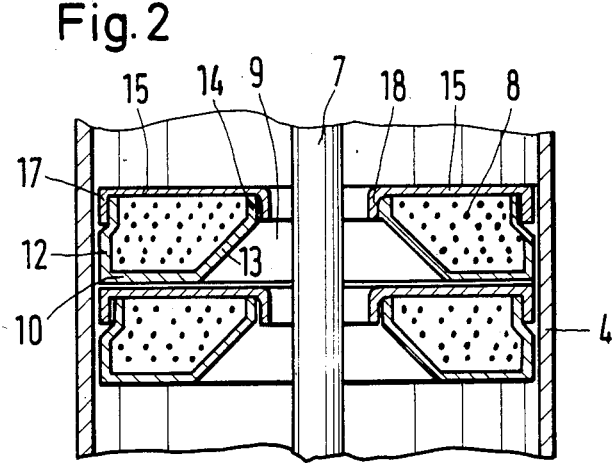
FIG. 2 illustrates powder boxes again with not yet hydride containing interior in accordance with particular example of the preferred embodiment for practicing the best mode thereof.

On the basis of this configuration then as far as each box 5 is concerned a certain annular space 9 is established as between each box and the central gas tube 7. This space 9 is the expansion chamber and space for the hydride forming interior of each box. The axially aligned cylindrical outer jackets 12 and 17 of the box 5 together are placed relatively tight against the inner surface of the cylindrical part 4 of pressure vessel 1. FIG. 2 illustrates in cut open view a relatively simple version for the box 5 as it is filled with hydride forming metal 8. Since the material 8 when forming hydride will expand considerably the upper part 10 and lower part 15 of each box will deform in a permanent fashion and to a considerable degree. The deformation that ensues is illustrated by way of example in FIG. 3.

Figure 3:
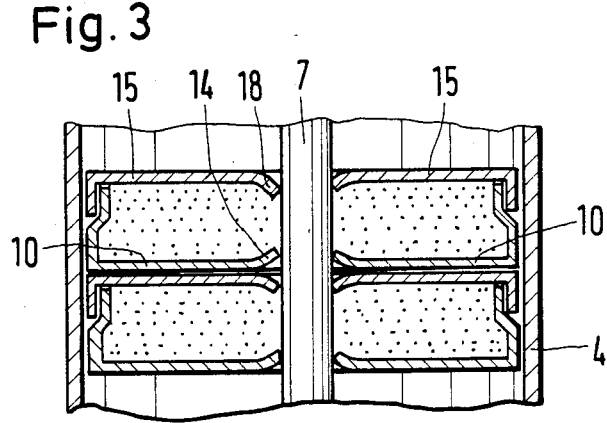
FIG. 3 illustrates the same boxes of FIG. 2 but after the formation of hydride and deformation of the boxes.

As one can see from FIG. 3 the parts of box 5 located in the vicinity of tube 7 have been stretched radially or folded inwardly and edges will abut snugly and tightly against the tube 7. This is so because of the relative dimensions given for parts 13,14 and 18 above. One can also see clearly that this way it is ensured that the basically disc shaped and partitioned, hydride forming metal 8 cannot relocate in axial direction and in between the several layers as provided through the stacking of boxes. This is an important prerequisite for preventing lasting deformaiton in the outer jacket of the pressure vessel itself. The conditions illustrated in FIG. 3 assume that the material has formed hydrides to such an extent that the grain size has dropped below 10 micrometers.

Figure 4:
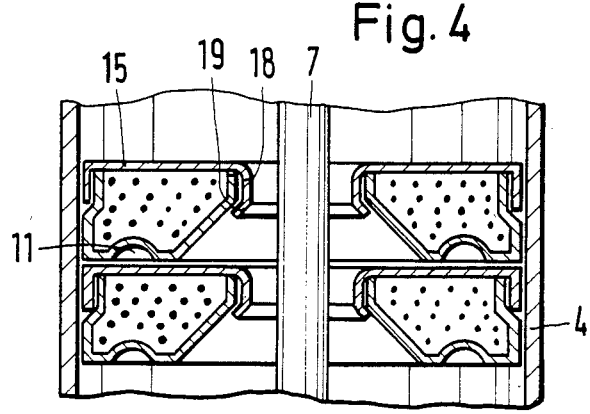
FIG. 4 is a cross section corresponding in principle to FIG. 2 but showing a slightly modified construction for the boxes.

FIG. 4 illustrates a further configuration for practicing the invention through appropriately configuring boxes 5. The box here has a beading 19 along the edge of the cylindrical inner jacket 18 which in contour matching configuration ensures that the upper part 15 of the box cannot be opened unintentionally. Moreover an annular recess or projection 11 is provided in the bottom of the lower part 10 of each box bulging in inwardly direction as far as the box is concerned and extending around the common axis of the system and particularly around the gas tube 7. This protrusion or recess 11 serves also as a compensating feature for the volume increase expected to incur when hydrogen is fed into the interior of the vessel for reaction with the material 8.

Figure 5:
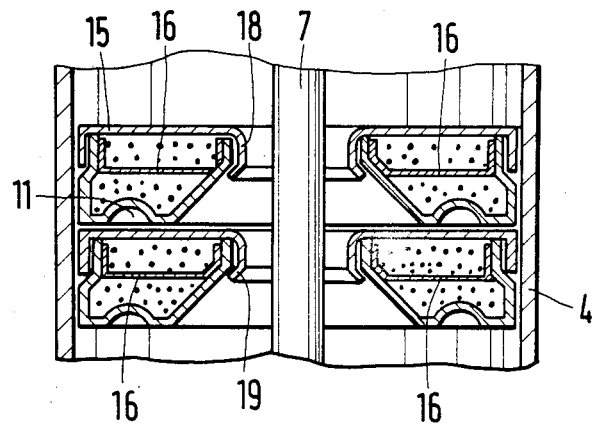
FIG. 5 is a cross section also corresponding in principle to FIG. 2 but including the partitions for further subdividing the interior of each of the boxes in accordance with the preferred embodiment of the present invention.

FIG. 5 illustrates an embodiment and configuration of the box 5 wherein the volume of the material i.e. the interior of the box is additionally partitioned in axial direction by means of a plurality of annularly intermediate partition sheets 16.

It has to be mentioned, moreover, that the dimensioning of the space 9 used in each instance is given in essence by the configuration of the outer dimensions of each box. The physical properties sa far as expansion of the material 8 is concerned are numerical parameters to be considered. Another parameter of importance is the size and size distinction of the granulate of the material 8 (described by relevant statistical parameters) because the individual grains will decompose and will physically be subdivided in the course of the individual loading and unloading cycles and that by itself will cause some increase in volume as was mentioned earlier. Therefore tests have to be conducted in order to ascertain at first which final volume per weight unit will the material 8 attain when fully converted into hydride. These are material specific parameters while on the other hand the dimensioning of the boxes 5 has to be considered. The granulate used to fill the box should have a particular and uniform statistical grain size distribution. This means that one has to make sure that as each box of given dimension is filled completely the same amount of material capable of forming hydride has been filled into the respective box. In summary the advantages of the invention can be stated as follows.

The powder boxes 5 serve as direct packaging device for the granulate which aspect permits safe transport from the point of production to the point of use without repackaging. Moreover these boxes can be standardized in a typological fashion so as to make sure on a large scale that indeed a uniform metering of hydride forming metal is permitted under consideration of technically permissible filling densities. These boxes are constructed to permit a fast heat exchange between exterior and interior which is a considerable improvement as compared with prior art pellet technique and involving particularly the exterior of the pressure vessel 1 and the material of the several boxes. The crimpings, recesses, flanges and the projections in the bottom and/or cover of each box have the property of an axially oriented spring and compensate therefore locally occuring volume expansions as far as peaks are concerned.

As far as process technology is concerned the manufacture and activation of a metal hydride storage facility in accordance with the invention offers the following advantages. Quality control that accompanies the construction is measured through the very simple mode of handling this storage material. From an overall point of view quality is safeguarded through limiting the number of different steps that have to be taken in the first place. Therefore significant costs are saved in the workings because complicated grinding and press working steps are no longer needed. The manufacture and activation of the novel metal hydride storage facility offers the following advantages. Quality is ensured particularly in the course of manufacture simply by operation of the very simple handling procedure of the storage material under consideration of the fact that the number of process steps to be undertaken is significantly smaller than prior art practices. Of course the preparation costs are considerably cheaper because complex grinding and press working is not necessary and also transportation and handling and packing costs are not necessary. Therefore, and also as compared with the prtior art technique, operating and working safety is considerably increased whereby a considerable point of importance is the fact that the grinding and the press working is not needed bearing in mind that the dust that may develop is quite pyropohoric.

The invention is not limited to the embodiemtns described above but all changes and modifications thereof, not constituting departures from the spirit and scope of the invention, are intended to be included.

I claim:

1. In a metal hydride storage facility which includes a cylindrical pressure vessel and a centrally mounted gas conducting tube in the interior of the vessel, the improvement comprising a plurality of annular, self contained boxes stacked in the interior of the vessel and being traversed by said tube, each box having an annular upper and an annular lower part and being filled with hydride forming material, each box being configured to establish an expansion volume such that upon receiving hydride each of the boxes is capable of expansion without exerting undue pressure upon the wall of said pressure vessel.

2. The improvement as in claim 1 wherein each box part has an inner and an outer flange.

3. The improvement as in claim 2, the outer flanges of the box parts overlap in parts and about an inner surface of the vessel.

4. The improvement as in claim 2 wherein the flanges of the lower box are axially terminating in a common plane.

5. The improvement as in claim 3 wherein said outer flange of each lower part is recessed, said upper part of each box having an outer flange reaching around the recessed portion of the lower part and abutting said inner surface wall of said pressure.

6. The improvement as in claim 2 wherein said expansion space is provided adjacent to said gas tube.

7. The improvement as in claim 6 wherein said expansion space is established at least in part through a combined cylindrical frustoconical configuration of said inner flange of the lower part of each box.

8. The improvement as in claim 2 said inner flange of the said upper box part having axial dimensions such that upon radial stretching in radial inwardly direction it will abut said gas tube.

9. The improvement as in claim 1, said boxes being closed in contour matching configuration.

10. The improvement as in claim 9 wherein said contour matching configuration is enhanced by beading the inner flange of the upper part of the box to extend along a conical portion of the inner flange of the lower part of the box.

11. The improvement as in claim 1 wherein at least one of the upper and lower axial bottoms of the box are provided with annular indentations extending in the interior of the box.

12. The improvement as in claim 1 including additional partitioning means in the interior of each box.

13. Method of assemblying and providing a metal hydride storage facility comprising the steps of:
   providing a cylindrical pressure vessel with a central gas conducting tube;
   providing a plurality of annular boxes to be stacked into said vessel such that the gas tube traverses an inner opening of each annular box;
   filling each box with hydride forming material having a grain size from between 0.2 to 2 mm and closing the box compleely;
   stacking said boxes into said pressure vessel;
   closing the pressure vessel; and
   heating at some point in time during and pursuant so the sequence of preceding steps, the boxes and evacuating the same.

14. Method as in claim 13 wherein said boxes are heated and immunized against atmospheric influences under utilization of protective gas; and
   activating the material in the boxes after insertion of the boxes in the pressure vessel.

15. Method as in claim 13 and including the step of heating and evacuating the pressure vessel after said boxes had been stacked therein.

* * * * *